Patented July 21, 1953

2,646,421

UNITED STATES PATENT OFFICE 2,646,421

POLYMERIC PYRAZOLONE COUPLERS

Charles F. H. Allen and Thomas T. M. Laakso, Rochester, N. Y., assignors to Eastman Kodak Company, Rochester, N. Y., a corporation of New Jersey No Drawing. Application March 14, 1952, Serial No. 276,677

9 Claims. (Cl. 260—78.5)

This invention relates to polymeric pyrazolone color-forming couplers, their preparation and the intermediates which are employed in that preparation.

Various pyrazolone color-forming couplers have been described in the art, but the molecular weight of those compounds has left something to be desired. In the use of couplers and the dyes prepared therefrom in photographic materials, wandering is undesirable. Therefore, couplers and dyes which form part of a large molecule are most desirable as the amount of wandering of compounds of that type is minimized.

One object of our invention is to provide pyrazolone couplers which are combined with a polymeric grouping so as to anchor the coupler and the dye resulting therefrom. Another object of our invention is to provide a material which is useful as an intermediate in the preparation of pyrazolone couplers of this type. A further object of our invention is to provide a pyrazolone coupler material in which the unit is combined or linked with further units of the same so as to form a continuous linkage thereof. Further objects of our invention will appear herein.

We have found that, although heretofore polymeric pyrazolone couplers were either unknown or very rare, such couplers can be prepared by starting with the copolymer of styrene and maleic anhydride which has been first nitrated and then reduced as described in U. S. Patent No. 2,274,551 of Kenyon, Minsk and Waugh. The polymeric amine thus formed diazotized and the diazonium salt thus resulting is reduced to the hydrazine by means of a reducing agent, such as stannous chloride or sodium hyposulfite. The hydrazino-styrene-maleic acid copolymer which is thus obtained is a light buff colored powdery solid having an analysis of 49.5% carbon, 5% hydrogen, 9.4% nitrogen and 13.5% chlorine, which copolymer has an empirical formula $C_{12}H_{15}O_4N_2Cl$.

The hydrazino-styrene-maleic acid copolymer is reacted with a compound which will result in a polymer having the recurring formula

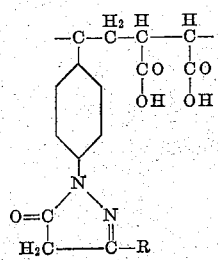

R being methyl, carboxy, phenol, p-methoxyphenyl, amino or benzamido, depending upon the compound which is reacted with the hydrazine of the polymer. The hydrazine compound need not be isolated from the reaction mass in which it is formed in order to further react the same with the compound desired to form a pyrazolone coupler, if that reaction mass is first treated with a small amount of an alkali metal salt of a weak acid, such as potassium or sodium acetate, to react with any residual mineral acid which may be present. However, it is within the scope of our invention, if one desires, to isolate the hydrazine derivative and react upon that isolated derivative with the desired compound. Ordinarily, the reaction occurs by heating the mixture of the hydrazino-styrene-maleic acid copolymer and an alkyl ester which will give the desired pyrazolone structure at an elevated temperature, such as under refluxing conditions, for a sufficient time to obtain a pyrazolone coupler of the type illustrated by the same formula given above. Some of the esters which will give a desired pyrazolone structure are: ethyl acetoacetate, ethyl ethoxyimino-propionate, ethyl benzoylacetate, ethyl oxalacetate sodium salt and ethyl anisoylacetate.

The following examples illustrate our invention:

*Example 1.—Preparation of the potassium salt of (3-methyl-5-keto-1-pyrazolinyl) styrene-maleic acid copolymer*

50 parts of styrene-maleic acid copolymer were dissolved in 500 parts of 50% acetic acid containing 38 parts of concentrated hydrochloric acid. This mixture was cooled to 0° C. and a solution of 20% aqueous sodium nitrite was slowly added until a slight excess was present. This was indicated by testing with starch-potassium iodide paper. The thus-obtained diazonium solution was gradually added to a cold, well-stirred solution of 85 parts of stannous chloride in 500 parts of 50% acetic acid which also contained 75 parts of concentrated HCl. A small sample of the hydrazino derivative thus obtained was separated and was analyzed for nitrogen content. It was found to contain 9.4% of nitrogen.

The hydrazino derivative, while still in its reaction mass, was mixed with enough sodium acetate to combine with the residual mineral acid present. There was then added 26 parts of ethyl acetoacetate, and the mixture was heated under reflux overnight with stirring. The mass was then precipitated by pouring into 3 volumes of acetone. The precipitate was washed twice with 1 volume portions of acetone and finally with distilled water. It was then dissolved in dilute potassium carbonate solution, and the resulting dope was filtered through felt. The resulting solution contained 4% by weight of the pyrazolone as the potassium salt. This material was found to be eminently suitable for incorporation in photographic emulsions. It is combinable with 2-amino-5-diethylaminotoluenehydrochloride in the presence of an oxidizing agent whereby it gives an intense magenta color.

The sample of hydrazine hydrochloride derivative of the copolymer which was used as an intermediate, which was isolated from the reaction mass, was obtained as follows: 1 volume of the mixture was poured into 2 volumes of glacial acetic acid with stirring. A gummy precipitate settled to the bottom and was separated by decantation. This material, if dissolved at once, is soluble in either distilled water or in acetone-free methanol.

*Example 2.—Preparation of the potassium salt of (3-amino-5-keto-1-pyrazolinyl) styrene-maleic acid copolymer*

An amino styrene-maleic acid polymer was converted to the polymeric phenylhydrazine hydrochloride as described in Example 1. This compound was isolated by pouring 100 parts of the reaction mass into 200 parts of glacial acetic acid. The polymer precipitated was decanted and was then dissolved in 500 parts of acetone-free methanol. 1.8 parts of potassium acetate in 125 parts of methanol was added, followed by the addition of a solution of 5.6 parts of ethyl ethoxyiminopropionate in 125 parts of methanol. The mass was refluxed for 3 hours with stirring. The polymer was precipitated with acetone, was washed twice with acetone and then with distilled water. The precipitate was dissolved in dilute potassium carbonate solution and the resulting dope was filtered. The material obtained gave an intense magenta color when treated with an aqueous solution of 2-amino-5-diethylaminotoluene hydrochloride and sodium periodate.

*Example 3.—Preparation of the potassium salt of (3-phenyl-5-keto-1-pyrazolinyl) styrene-maleic acid copolymer*

Polymeric phenylhydrazine hydrochloride was isolated as in the preceding example. The polymer precipitated from 500 parts of reaction mass was dissolved in 700 parts of acetone-free methanol. The solution was refluxed and there was stirred into the solution a solution of 918 parts of potassium acetate in 100 parts of methanol, followed by the addition of a solution of 37.6 parts of ethyl benzoylacetate in 125 parts of methanol. The refluxing was continued for 1 hour. The polymer was precipitated with acetone, separated by filtration, washed with methanol and suspended in 1 liter of distilled water containing 50 parts of potassium carbonate. The suspension was heated and stirred for 2 hours forming a solution of the polymeric product. This solution, which filtered, was found to be adapted for use as a pyrazolone coupler.

*Example 4.—Preparation of the patassium salt of (3-carboxy-5-keto-1-pyrazolinyl) styrene-maleic acid copolymer*

A polymeric phenylhydrazine hydrochloride was isolated as described in Example 2. The polymer, as obtained from 250 parts of reaction mixture, was dissolved in 500 parts of acetone-free methanol. 23.3 parts of the sodium salt of ethyl oxalacetate was dissolved in 750 parts of pure methanol and the polymeric phenylhydrazine hydrochloride solution was gradually added thereto with heating and stirring. The resulting solution was refluxed for ½ hour after this addition. The polymer, which was precipitated with acetone, was separated by filtration, washed with methanol and dissolved in a solution of 20 parts of potassium carbonate in 450 parts of distilled water. The material obtained was found to be eminently suited for use as a pyrazolone coupler.

*Example 5.—Preparation of the potassium salt of (3-anisoyl-5-keto-1-pyrazolinyl) styrene-maleic acid copolymer*

The polymeric phenylhydrazine hydrochloride was precipitated from 450 parts of reaction mixture and was dissolved in 700 parts of acetone-free methanol. The solution was heated to reflux with stirring and a solution of 8.1 parts of potassium acetate in 100 parts of methanol was added at once, followed by a solution of 36 parts of ethyl anisoyl acetate in 125 parts of pure methanol. The refluxing was continued for 1 hour. The product was precipitated, separated by filtration, washed with methanol and suspended in 1000 parts of distilled water containing 50 parts of potassium carbonate. The suspension was heated and stirred for 2 hours and then filtered. The polymeric coupler salt solution obtained gave a good color test under the usual conditions for coupling.

*Example 6.—Preparation of the potassium salt of (3-benzamido-5-keto-1-pyrazolinyl) styrene-maleic acid copolymer*

The polymeric phenylhydrazine hydrochloride precipitated from 500 parts of reaction mixture was dissolved in 500 parts of acetone-free methanol. Solutions of 4 parts of potassium acetate in 100 parts of pure methanol and 30 parts of ethyl ethoxyiminopropionate in 100 parts of pure methanol were added at once with stirring. After being heated and stirred for ½ hour, the precipitated polymer was filtered and dissolved in a solution of 35 parts of potassium carbonate in 500 parts of distilled water. The solution was filtered and the filtrate was treated with 15 parts of benzoyl chloride with vigorous stirring over a period of ½ hour. The solution obtained was filtered and was found to give a brilliant magenta color under the usual conditions for coupling.

We claim:

1. A polymeric pyrazolone coupler having the recurring structural formula

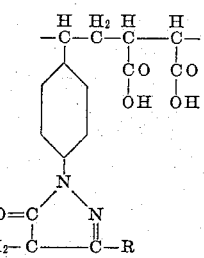

R being selected from the group consisting of methyl, carboxy, p-methoxyphenyl, amino and benzamido.

2. The alkali metal salt of (3-methyl-5-keto-1-pyrazolinyl) styrene-maleic acid copolymers.

3. The alkali metal salt of (3-amino-5-keto-1-pyrazolinyl)styrene-maleic acid copolymers.

4. The alkali metal salt of (3-phenyl-5-keto-1-pyrazolinyl) styrene-maleic acid copolymers.

5. The alkali metal salt of (3-carboxy-5-keto-1-pyrazolinyl)styrene-maleic acid copolymers.

6. The alkali metal salt of (3-anisoyl-5-keto-1-pyrazolinyl)styrene-maleic acid copolymers.

7. A method of preparing a polymeric pyrazolone coupler which comprises diazotizing the amino hydrochloride derivative of styrene-maleic acid copolymer with nitrous acid, reducing the diazonium salt to form the hydrazine derivative, followed by reacting the hydrazine derivative with a reagent selected from the group of ethyl acetoacetate, ethyl ethoxyiminopropionate, ethyl benzoylacetate, ethyl oxylacetate, ethyl anisoylacetate and the combination consisting of ethyl ethoxyiminopropionate and benzoyl chloride, whereby a polymeric pyrazolone coupler is obtained.

8. A process of preparing a polymeric pyrazolone coupler which comprises diazotizing an amino hydrochloride derivative of styrene-maleic acid copolymer with nitrous acid, reducing the diazonium salt, whereby the hydrazine derivative is formed, and then reacting upon the hydrazine derivative of the styrene-maleic acid copolymer with ethyl acetoacetate.

9. The process of preparing the hydrazine derivative of styrene-maleic acid copolymer which comprises diazotizing the amino hydrochloride derivative of styrene-maleic acid copolymer and reducing the diazonium salt thus formed with a reducing agent selected from the group consisting of stannous chloride and sodium hyposulfite.

CHARLES F. H. ALLEN.
THOMAS T. M. LAAKSO.

References Cited in the file of this patent

UNITED STATES PATENTS

| Number | Name | Date |
|---|---|---|
| 2,274,551 | Kenyon et al. | Feb. 24, 1942 |
| 2,354,552 | Schneider et al. | July 25, 1944 |